US010299013B2

(12) United States Patent
Petrillo et al.

(10) Patent No.: US 10,299,013 B2
(45) Date of Patent: May 21, 2019

(54) MEDIA CONTENT ANNOTATION

(71) Applicant: Disney Enterprises, Inc., Burbank, CA (US)

(72) Inventors: Matthew Petrillo, Sandy Hook, CT (US); Katharine Ettinger, Santa Monica, CA (US); Miquel Angel Farre Guiu, Bern (CH); Anthony M. Accardo, Los Angeles, CA (US); Marc Junyent Martin, Barcelona (ES)

(73) Assignee: Disney Enterprises, Inc., Burbank, CA (US)

( * ) Notice: Subject to any disclaimer, the term of this patent is extended or adjusted under 35 U.S.C. 154(b) by 16 days.

(21) Appl. No.: 15/666,415

(22) Filed: Aug. 1, 2017

(65) Prior Publication Data
US 2019/0045277 A1 Feb. 7, 2019

(51) Int. Cl.
*H04N 21/84* (2011.01)
*H04N 21/8547* (2011.01)
*H04N 21/231* (2011.01)
*G11B 27/34* (2006.01)
*G11B 27/036* (2006.01)

(52) U.S. Cl.
CPC ........... *H04N 21/84* (2013.01); *G11B 27/036* (2013.01); *G11B 27/34* (2013.01); *H04N 21/231* (2013.01); *H04N 21/8547* (2013.01)

(58) Field of Classification Search
CPC .. H04N 21/84; H04N 21/231; H04N 21/8547; G11B 27/036; G11B 21/34
See application file for complete search history.

(56) References Cited

U.S. PATENT DOCUMENTS

| 2004/0210926 | A1* | 10/2004 | Francis | H04N 7/163 725/25 |
| 2008/0154908 | A1* | 6/2008 | Datar | G06F 17/30817 |
| 2008/0304808 | A1* | 12/2008 | Newell | G06F 17/30029 386/278 |
| 2009/0064227 | A1* | 3/2009 | Eronen | H04H 60/47 725/46 |
| 2009/0254935 | A1* | 10/2009 | Shah-Nazaroff | H04H 60/33 725/24 |
| 2009/0300475 | A1* | 12/2009 | Fink | H04N 7/17318 715/230 |

(Continued)

*Primary Examiner* — Thai Q Tran
*Assistant Examiner* — Sunghyoun Park
(74) *Attorney, Agent, or Firm* — Farjami & Farjami LLP

(57) ABSTRACT

According to one implementation, a media content annotation system includes a computing platform including a hardware processor and a system memory storing a model-driven annotation software code. The hardware processor executes the model-driven annotation software code to receive media content for annotation, identify a data model corresponding to the media content, and determine a workflow for annotating the media content based on the data model, the workflow including multiple tasks. The hardware processor further executes the model-driven annotation software code to identify one or more annotation contributors for performing the tasks included in the workflow, distribute the tasks to the one or more annotation contributors, receive inputs from the one or more contributors responsive to at least some of the tasks, and generate an annotation for the media content based on the inputs.

16 Claims, 4 Drawing Sheets

(56) References Cited

U.S. PATENT DOCUMENTS

2010/0318542 A1* 12/2010 Davis .................. G06F 16/7867
707/759
2013/0198602 A1* 8/2013 Kokemohr ............ G06F 17/241
715/233
2016/0088355 A1* 3/2016 Zubarieva .......... H04N 21/4755
725/19

* cited by examiner

MEDIA CONTENT ANNOTATION

BACKGROUND

The annotation of media content through the generation of descriptive metadata having sufficient richness to characterize that media content has traditionally required the collaboration of human contributors with specialized knowledge. Although authoring tools enabling collaboration among such human contributors exist, those conventional tools are typically designed to passively process the inputs provided by each collaborator. Moreover, conventional authoring tools are typically specific to a certain type of media content. As a result, an annotation authoring tool designed to enable collaboration among annotators of movie content, for example, may be built around workflows that are unsuitable for use in annotating television programming content.

As the amount and variety of media content available to consumers continues to proliferate, the accuracy and efficiency with which that content can be annotated has become increasingly important. Consequently, there is a need in the art for an integrated annotation authoring solution that can be flexibly applied to multiple types of media content.

SUMMARY

There are provided systems and methods for media content annotation, substantially as shown in and/or described in connection with at least one of the figures, and as set forth more completely in the claims.

DETAILED DESCRIPTION

Figure 1:
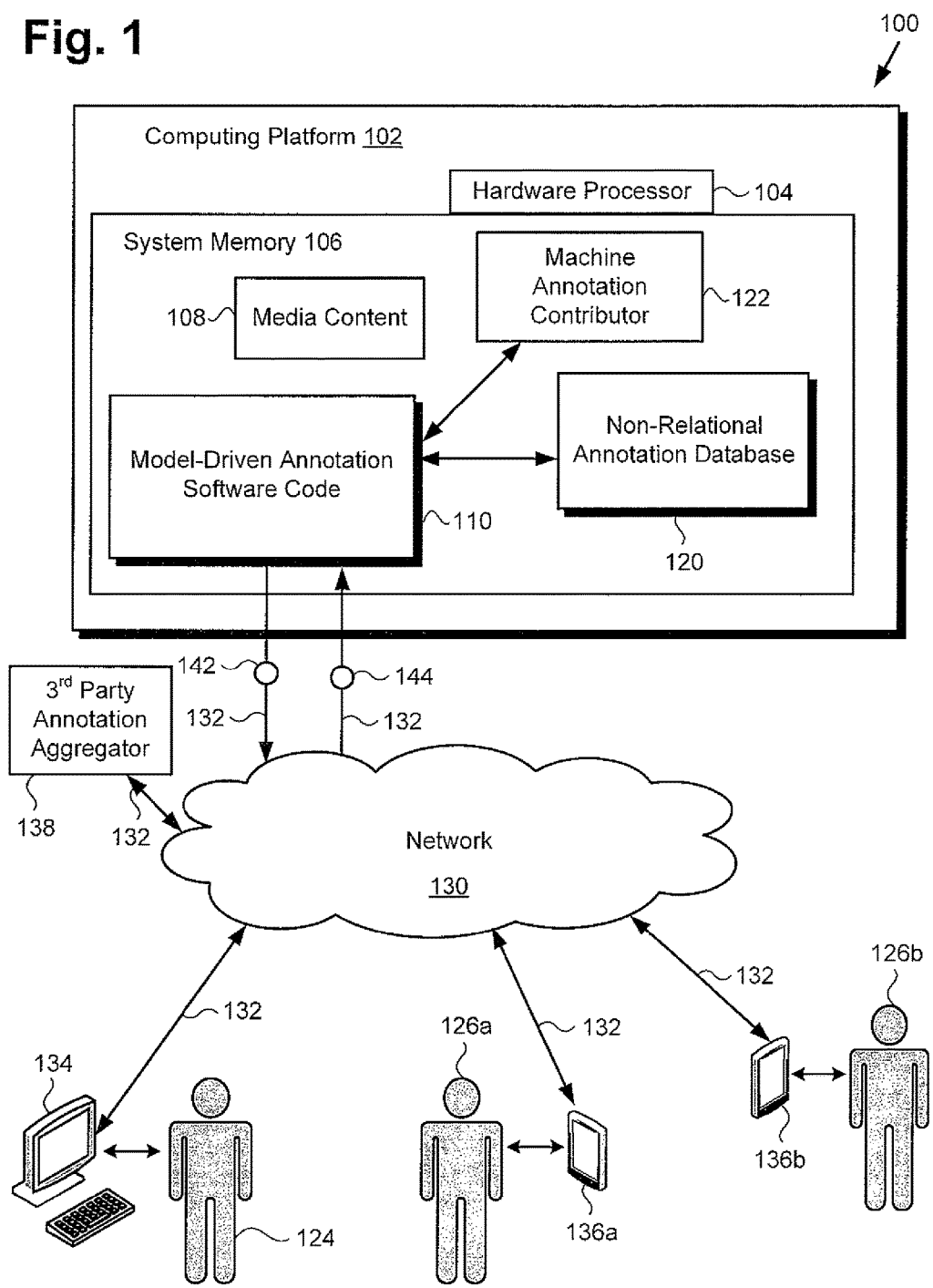
FIG. 1 shows an exemplary media content annotation system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, the annotation of media content through the generation of descriptive metadata having sufficient richness to characterize that media content has traditionally required the collaboration of human contributors with specialized knowledge. As further stated above, although authoring tools enabling collaboration among such human contributors exist, those conventional tools are typically designed to passively process the inputs provided by each collaborator. Moreover, conventional authoring tools are typically specific to a certain type of media content. As a result, an annotation authoring tool designed to enable collaboration among annotators of movie content, for example, may be built around workflows that are unsuitable for use in annotating television programming content.

However, as the amount and variety of media content available to consumers continues to proliferate, the accuracy and efficiency with which that content can be annotated has become increasingly important. Consequently, there is a need in the art for an integrated annotation authoring solution that can be flexibly applied to multiple types of media content.

The present application discloses media content annotation solutions that address and overcome the deficiencies in the conventional art described above. By providing media content annotation systems and methods designed to determine an annotation workflow based on a data model corresponding to the media content requiring annotation, the present solution can advantageously be adapted to a wide variety of media content types. In addition, by identifying one or more annotation contributors for performing tasks included in the workflow, and distributing the tasks accordingly, the present solution actively manages workflow processing and completion. Moreover, the present solution ensures that the annotations generated through its use are richly connected by being stored and linked in a non-relational annotation database.

It is noted that, as used in the present application, the feature "non-relational annotation database" refers to a NoSQL database that utilizes graph theory to store and map database entries. In other words, the non-relational annotation databases described in the present disclosure may take the form of graph-oriented databases, and may be implemented as triplestores, for example. Such non-relational annotation databases store annotations, i.e., data and metadata, describing media content. The media content described by annotation entries in the non-relational annotation databases may include video, such as movie content, dramatic or comedic television (TV) content, sports content, TV news content, or short form content such as one or more video clips, advertisements, games, or animations, for example.

FIG. 1 shows exemplary media content annotation system 100, according to one implementation. As shown in FIG. 1, media content annotation system 100 includes computing platform 102 having hardware processor 104 and system memory 106. According to the exemplary implementation represented in FIG. 1, system memory 106 stores media content 108, model-driven annotation software code 110, non-relational annotation database 120, and optional machine annotation contributor 122.

Also shown in FIG. 1 are user 124 of media content annotation system 100, user device 134, $3^{rd}$ party annotation aggregator 138, and communication network 130 providing network communication links 132. In addition, FIG. 1 shows human annotation contributors 126a and 126b, communication devices 136a and 136b used by respective human annotation contributors 126a and 126b, tasks 142 distributed via communication network 130 and network communication links 132, and inputs 144 to media content annotation system 100 received via communication network 130 and network communication links 132.

It is noted that computing platform 102 of media content annotation system 100 may be implemented using one or more computer servers, which may be co-located, or may form an interactively linked but distributed system. For example, media content annotation system 100 may be a cloud-based media content annotation system. As a result, hardware processor 104 and system memory 106 may correspond to distributed processor and memory resources of media content annotation system 100. Thus, it is to be understood that although media content 108, model-driven annotation software code 110, non-relational annotation database 120, and optional machine annotation contributor 122 are depicted as being stored together in system memory 106, in other implementations, one or more of those assets may be stored remotely from one another and/or may be executed using the distributed processor resources of media content annotation system 100.

According to the implementation shown by FIG. 1, user 124 may utilize user device 134 to interact with media content annotation system 100 over communication network 130. In one such implementation, media content annotation system 100 may correspond to one or more web servers, accessible over a packet-switched network such as the Internet, for example. Alternatively, media content annotation system 100 may correspond to one or more computer servers supporting a local area network (LAN), or included in another type of limited distribution network.

Although user device 134 is shown as a personal computer (PC), while communication devices 136a and 136b are shown as smartphones, in FIG. 1, those representations are provided merely as examples. In other implementations, user device 134 and communication devices 136a and 136b may be any other suitable mobile or stationary computing device or system. For example, in other implementations, any or all of user device 134 and communication devices 136a and 136b may take the form of a PC, laptop computer, tablet computer, or smartphone, for example. User 124 may utilize user device 134 to interact with media content annotation system 100 and to use model-driven annotation software code 110, executed by hardware processor 104, to generate one or more annotations for media content 108.

Figure 2:
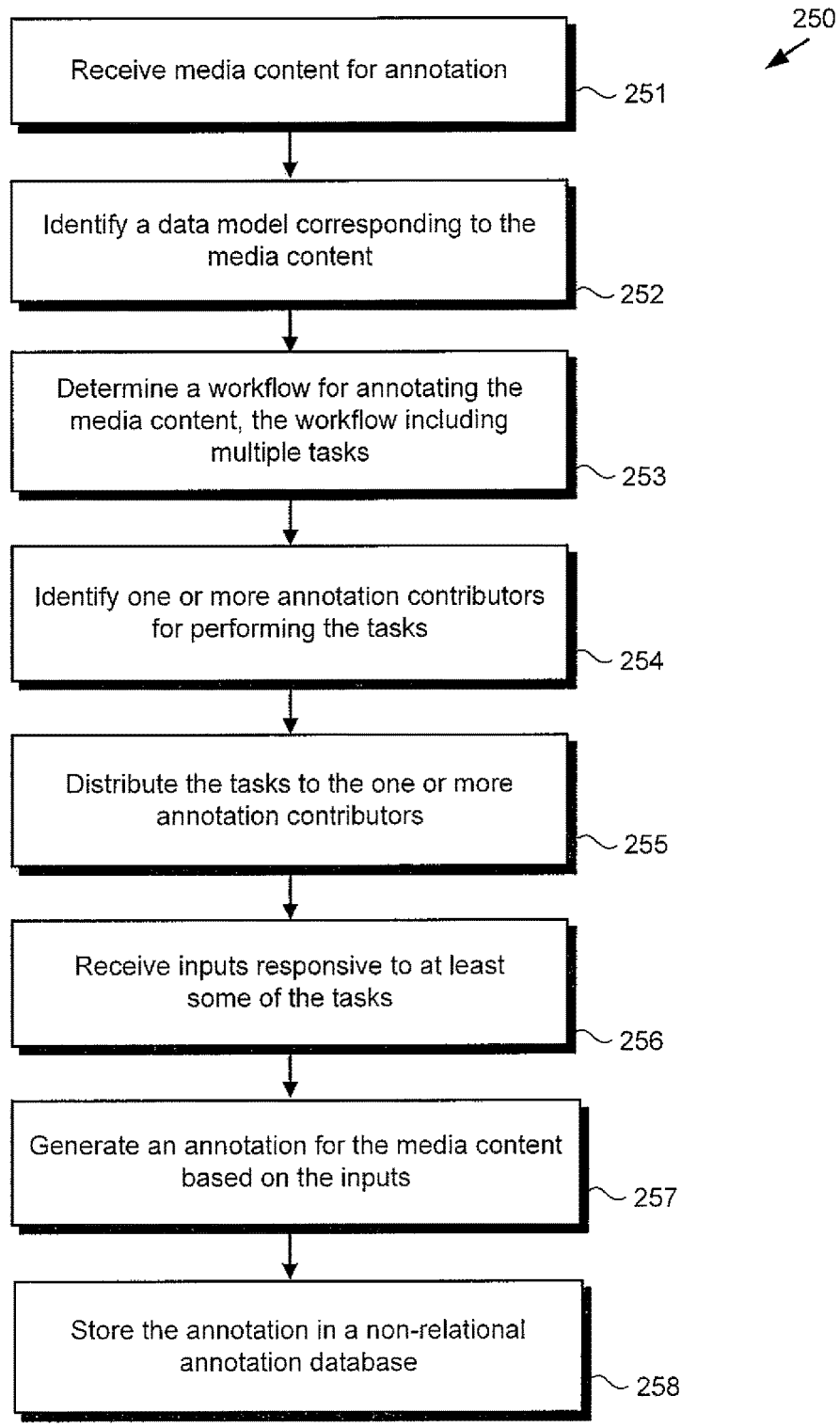
FIG. 2 shows a flowchart presenting an exemplary method for performing media content annotation, according to one implementation.
Figure 3:
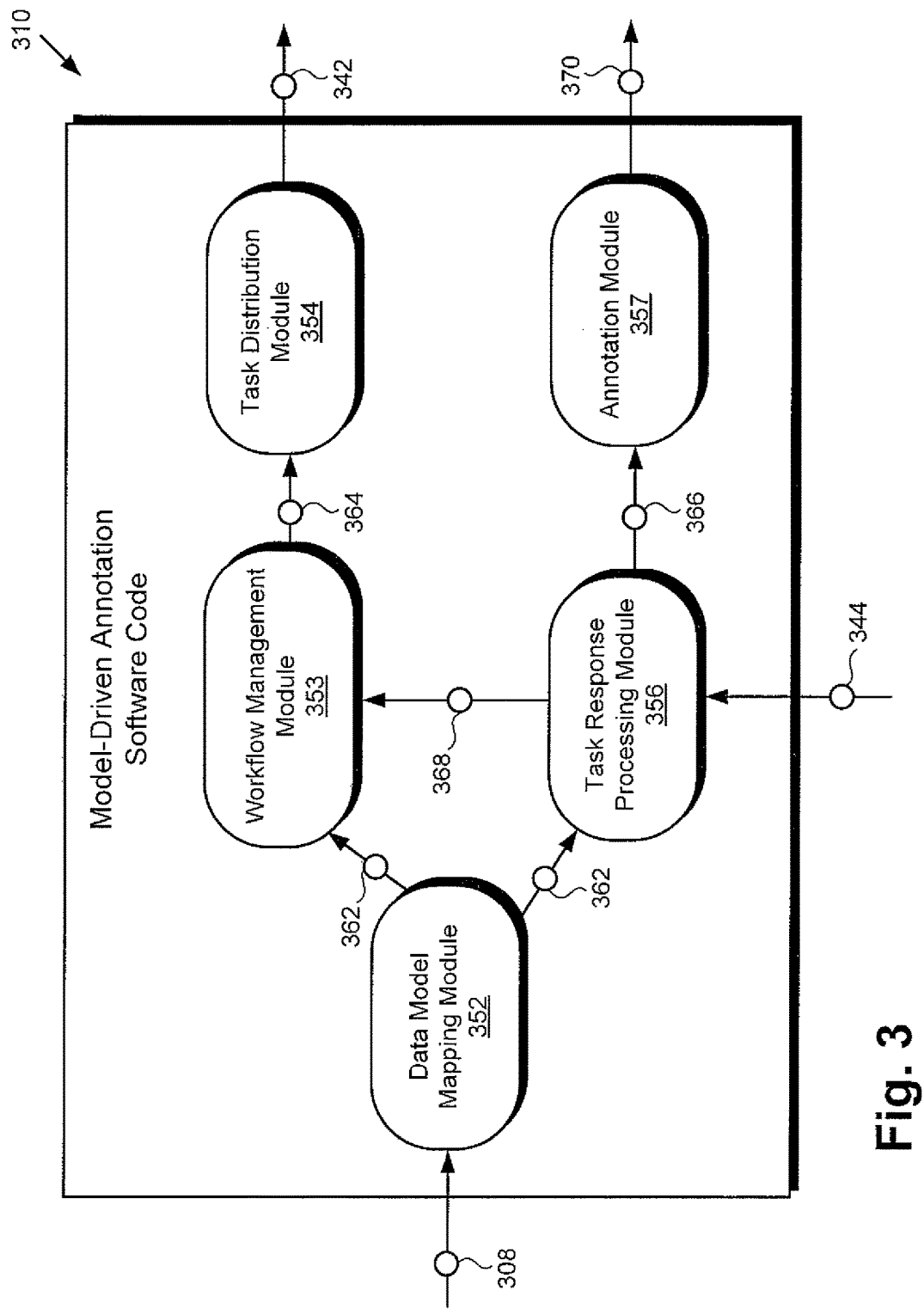
FIG. 3 shows an exemplary diagram of a model-driven annotation software code suitable for execution by a hardware processor of the system shown by FIG. 1, according to one implementation.
Figure 4:
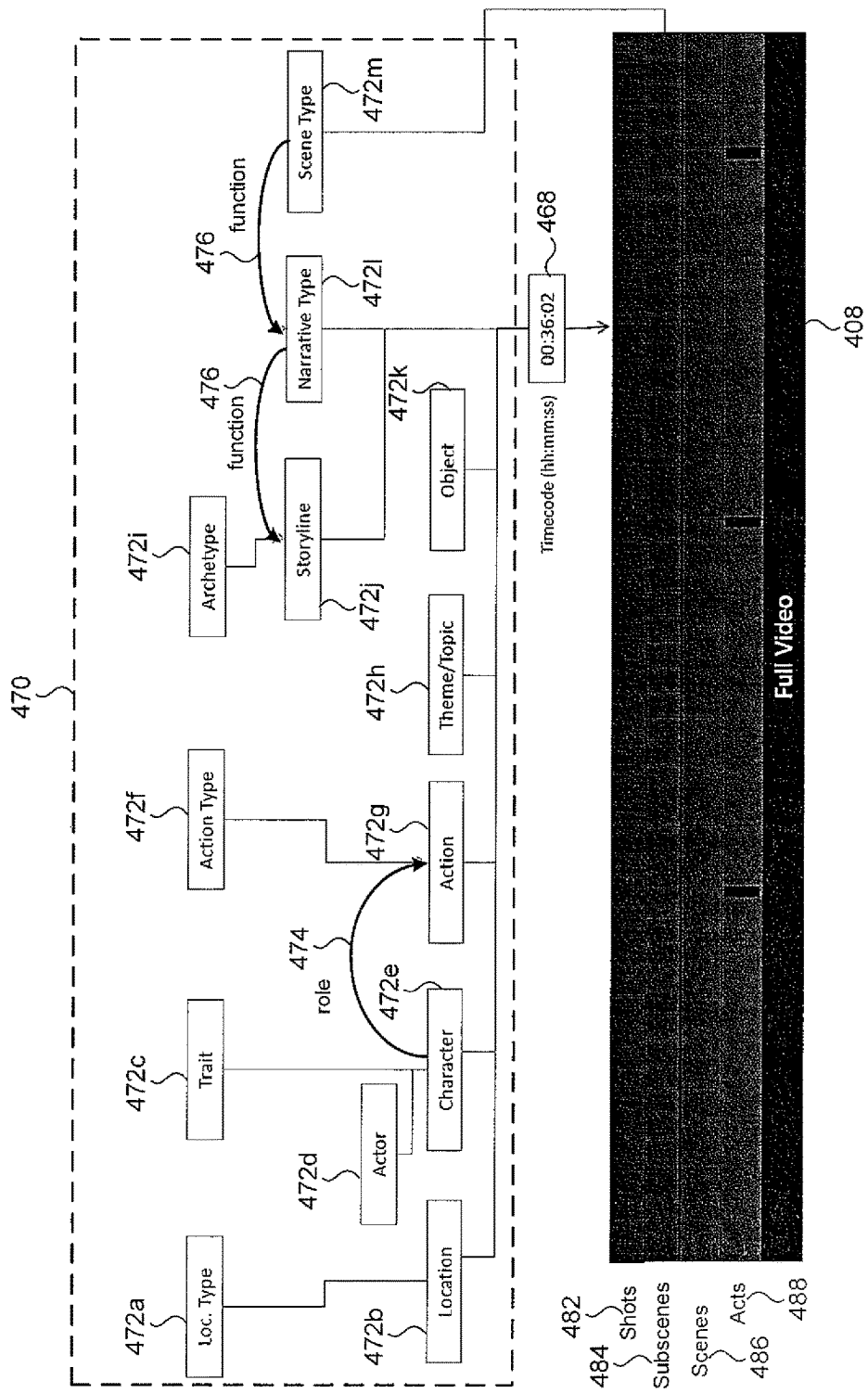
FIG. 4 shows exemplary annotated media content in the form of a video including annotation entries indexed to a timecode of the video, according to one implementation.

The functionality of media content annotation system 100 will be further described by reference to FIG. 2 in combination with FIGS. 3 and 4. FIG. 2 shows flowchart 250 presenting an exemplary method for use by a system, such as media content annotation system 100, in FIG. 1, to perform media content annotation, while FIG. 3 shows a more detailed representation of a model-driven annotation software code, and FIG. 4 shows an exemplary annotated media content. With respect to the method outlined in FIG. 2, it is noted that certain details and features have been left out of flowchart 250 in order not to obscure the discussion of the inventive features in the present application.

Regarding FIG. 3, FIG. 3 shows exemplary model-driven annotation software code 310 suitable for execution by hardware processor 104 of media content annotation system 100, according to one implementation. As shown in FIG. 3, model-driven annotation software code 310 may include data model mapping module 352, workflow management module 353, task distribution module 354, task response processing module 356, and annotation module 357. Also shown in FIG. 3 are media content 308, data model 362, workflow 364, tasks 342, inputs 344 responsive to at least some of tasks 342, processed task responses 366, workflow modification 368, and annotation 370 for media content 308.

Media content 308, tasks 342, and inputs 344 responsive to at least some of tasks 342 correspond respectively in general to media content 108, tasks 142, and inputs 144, in FIG. 1, and those corresponding features may share any of the characteristics attributed to either corresponding feature by the present disclosure. Moreover, model-driven annotation software code 310 corresponds in general to model-driven annotation software code 110, in FIG. 1, and those corresponding features may share any of the characteristics attributed to either corresponding feature by the present disclosure. That is to say, like model-driven annotation software code 310, model-driven annotation software code 110 may include modules corresponding to data model mapping module 352, workflow management module 353, task distribution module 354, task response processing module 356, and annotation module 357.

With respect to FIG. 4, FIG. 4 shows exemplary media content 408 in the form of a video, and annotation 470 indexed to timecode 468 of media content 408 and including multiple annotation entries, according to one implementation. According to the exemplary implementation shown in FIG. 4, media content 408 includes a video file with timecode 468 and including media content segments identified as shots 482, subscenes 484, scenes 486, and acts 488. Annotation 470 is indexed to timecode 468 and includes multiple annotation entries including location type 472a, location 472b, trait 472c, actor 472d, character 472e, action type 472f, action 472g, theme or topic 472h, archetype 472i, storyline 472j, object 472k, narrative type 472l, and scene type 472m (hereinafter "annotation entries 472a-472m").

Also shown in FIG. 4 are function links 476 linking scene type annotation entry 472m to narrative type annotation entry 472l, and linking narrative type annotation entry 472l to storyline annotation entry 472j. In addition, FIG. 4 shows role link 474 linking character annotation entry 472e to action annotation entry 472g. It is noted that annotation 470 including annotation entries 472a-472m, function links 476, and role link 474 is indexed to timecode 468. Moreover, and as further shown by FIG. 4, annotation 470 includes annotation entries 472a-472m, function links 476, and role link 474 in the form of deep, structured metadata, and may be indexed to timecode 468 at a fine level of granularity, such as at time intervals of one or more fractions of seconds, such as one or more tenths or hundredths of seconds, for example.

Media content 408 including timecode 468 corresponds in general to media content 108/308 in FIGS. 1 and 3, and those corresponding features may share the characteristics attributed to any corresponding feature by the present disclosure. In addition, annotation 470 including annotation entries 472a-472m, function links 476, and role link 474 corresponds in general to annotation 370, in FIG. 3, and those corresponding features may share any of the characteristics attributed to either corresponding feature by the present disclosure.

Referring now to FIG. 2 in combination with FIGS. 1, 3, and 4, flowchart 250 begins with receiving media content 108/308/408 for annotation (action 251.) By way of example, user 124 may utilize user device 134 to interact with media content annotation system 100 in order to initiate annotation of media content 108/308/408. In one implementation, user 124 may do so by transmitting media content 108/308/408 from user device 134 to media content annotation system 100 via communication network 130 and network communication links 132. Alternatively, media content 108/308/408 may be received from a third party source of video or other media content (third party media content source not shown in the present figures), or may be stored in system memory 106 as shown in FIG. 1. Media content 108/308/408 may be received by model-driven annotation software code 110/310, executed by hardware processor 104.

As noted above, media content 108/308/408 may include video, such as movie content, dramatic or comedic TV content, sports content, TV news content, or short form content such as one or more video clips, advertisements, games, or animations, for example. In various implementations, media content 108/308/408 may include ultra high-definition (ultra HD), HD, or standard-definition (SD) baseband video with embedded audio, captions, timecode 468, and other ancillary data, such as ratings and/or parental guidelines. In some implementations, media content 108/308/408 may include multiple audio tracks, and may utilize secondary audio programming (SAP) and/or Descriptive Video Service (DVS), for example.

Flowchart 250 continues with identifying data model 362 corresponding to media content 108/308/408 (action 252.) Data model 362 corresponding to media content 108/308/408 may be identified by model-driven annotation software code 110/310, executed by hardware processor 104, and using data model mapping module 352.

For example, data model 362 corresponding to media content 108/308/408 and used to generate annotation 370/470 of media content 108/308/408 can vary based on the type of content included as media content 108/308/408. Various distinctions among media content types may include movie content versus episodic TV programming content, between TV entertainment content and TV news or sports content, or between dramatic and comedic TV content, to name a few specific examples.

Thus, in a use case in which media content 108/308/408 is dramatic TV content, for example, data model 362 may be a data model designed specifically for annotation of such dramatic TV content. By contrast, in a use case in which media content 108/308/408 is TV news or sports content, for example, data model 362 may be a data model designed specifically for annotation of news or sports, and may differ significantly from data model 362 used in the annotation of dramatic TV content.

Flowchart 250 continues with determining workflow 364 for annotating media content 108/308/408 based on data model 362, where workflow 364 includes multiple tasks 142/342 (action 253.) Workflow 364 for annotating media content 108/308/408 may be determined by model-driven annotation software code 110/310, executed by hardware processor 104, and using workflow management module 353.

Even when based on the same data model 362, workflow 364 can also vary based on differences in the content included as media content 108/308/408. Various differences among media content corresponding to a common data model may include dramatic or comedic genre, news subject matter, or the particular sport being covered by sports content, to name a few specific examples.

Thus, in a use case in which media content 108/308/408 is dramatic TV content, for example, workflow 364 may differ depending on whether the dramatic content is action oriented content or dialog driven content. Alternatively, in a use case in which media content 108/308/408 is comedic TV content, for example, workflow 364 may differ depending on whether the comedic content is romantic comedy, or black comedy, also known as dark comedy and often including gallows humor.

Flowchart 250 continues with identifying one or more annotation contributors 122/126a/126b for performing tasks 142/342 (action 254.) One or more annotation contributors 122/126a/126b for performing tasks 142/342 may be identified by model-driven annotation software code 110/310, executed by hardware processor 104, and using task distribution module 354. As shown in FIG. 1, in one implementation, annotation contributors for performing tasks 142/342 may include human annotation contributors 126a and 126b, and automated annotation contributors, such as machine annotation contributor 122 optionally included in media content annotation system 100.

It is noted that in some implementations, task distribution module 354 can utilize data model 362 to determine how to present tasks 142/342, and to which subset of annotation contributors 122/126a/126b tasks 142/342 should be distributed to. Furthermore, in some implementations, the selection of contributors 122/126a/126b might be based on explicit rules defined in workflow 364, and/or on historic performance information corresponding to one or more of contributors 122/126a/126b based on previous assignment of similar or analogous tasks to one or more of contributors 122/126a/126b.

Flowchart 250 continues with distributing tasks 142/342 to one or more annotation contributors 122/126a/126b (action 255.) Distribution of tasks 142/342 to one or more annotation contributors 122/126a/126b may be performed by model-driven annotation software code 110/310, executed by hardware processor 104, and using task distribution module 354.

According to the exemplary implementation shown in FIG. 1, media content annotation system 100 includes optional machine annotation contributor 122. In that implementation, distribution of one or more of tasks 142/342 to machine annotation contributor 122 may include transfer of data corresponding to the one or more of tasks 142/342 from model-driven annotation software code 110/310 to machine annotation contributor 122. However, in implementations in which machine annotation contributor 122 is stored remotely from media content annotation system and/or is provided by a third party machine annotation service, distribution of one or more of tasks 142/342 to machine annotation contributor 122 may be via communication network 130 and network communication links 132.

In addition, and as shown in FIG. 1, media content annotation system 100 is in communication with human annotation contributors 126a and 126b via communication network 130, network communication links 132, and communication devices 136a and 136b used by respective human annotation contributors 126a and 126b. As noted above, communication network 130 may be a packet-switched network, for example, such as the Internet. Thus, in one implementation, distribution of one or more of tasks 142/342 to human annotation contributors 126a and 126b may be via communication network 130 and network communication links 132.

Alternatively, or in addition, in some implementations, media content annotation system 100 may utilize third party annotation aggregator 138 to coordinate distribution of one or more of tasks 142/342 to human annotation contributors 126a and 126b. In one such exemplary implementation, third party annotation aggregator 138 may correspond to a crowdsourcing Internet marketplace, such as Amazon Mechanical Turk (Mturk™), for example.

Flowchart 250 continues with receiving inputs 144/344 responsive to at least some of tasks 142/342 (action 256.) Inputs 144/344 responsive to at least some of tasks 142/342 may be received by model-driven annotation software code 110/310, executed by hardware processor 104, and using task response processing module 356.

In implementations in which media content annotation system 100 includes optional machine annotation contributor 122, receiving one or more of inputs 144/344 responsive to at least some of tasks 142/342 may include transfer of data corresponding to the one or more of inputs 144/344 from machine annotation contributor 122 to model-driven annotation software code 110/310. However, in implementations in which machine annotation contributor 122 is stored remotely from media content annotation system and/or is provided by a third party machine annotation service, receiving one or more of inputs 144/344 responsive to at least some of tasks 142/342 may occur via communication network 130 and network communication links 132.

With respect to human annotation contributors 126a and 126b, in one implementation, receiving one or more of inputs 144/344 responsive to at least some of tasks 142/342 may occur via communication network 130 and network communication links 132, directly from human annotation contributors 126a and 126b. Alternatively, or in addition, in some implementations, media content annotation system 100 may utilize third party annotation aggregator 138 to coordinate collection of one or more of inputs 144/344 responsive to at least some of tasks 142/342 from human annotation contributors 126a and 126b. For example, and as noted above, in one implementation, third party annotation aggregator 138 may correspond to a crowdsourcing Internet marketplace such as Mturk™.

Flowchart 250 continues with generating annotation 370/470 for media content 108/308/408 based on inputs 144/344 (action 257.) For example, in one implementation, model-driven annotation software code 110/310 may utilize task response processing module 356 to perform any of a variety of operations on inputs 144/344 to produce processed task responses 366. Examples of such operations may include filtering out inputs 144/344 identified as inappropriate or unresponsive relative to tasks 142/342, averaging, collating, or otherwise synthesizing inputs 144/344 responsive to the same or similar tasks of tasks 142/342, and/or modifying one or more of earlier received inputs 144/344 based on one or more later received inputs 141/344, to name a few.

As shown in FIG. 1, processed task responses 366 may be provided as outputs from task response processing module 356 to annotation module 357. Annotation 370/470 for media content 108/308/408 may be generated by model-driven annotation software code 110/310, executed by hardware processor 104, and using annotation module 357. Moreover, and as noted above, annotation 370/470 for media content 108/308/408 may be generated using processed task responses 366 based on inputs 144/344 responsive to at least some of tasks 142/342.

Flowchart 250 can conclude with storing annotation 370/370 in non-relational annotation database 120 (action 258.) Annotation 370/470 may be stored in non-relational annotation database 120 by model-driven annotation software code 110/310, executed by hardware processor 104. As noted above, non-relational annotation database 120 may be a NoSQL database that utilizes graph theory to store and map annotation entries. As a specific example, non-relational annotation database 120 may be implemented as a triplestore.

It is noted that, in some implementations, actions 251, 252, 253, 254, 255, 256, 257, and 258 may be performed by media content annotation system, using model-driven annotation software code 110/310 executed by hardware processor 104, but without intervention or participation of a human annotation editor or curator. In other words, in some implementations, model-driven annotation software code 110/310, when executed by hardware processor 104, can guide the generation and storage of annotation 370/470 for media content 108/308/408 substantially autonomously.

It is also noted that, in some implementations, the method outlined by flowchart 250 may include adapting workflow 364 based on inputs 144/344 responsive to at least some of tasks 142/342. For example, failure of inputs 144/344 to include timely responses to some of tasks 142/342 may result in model-driven annotation software code 110/310, executed by hardware processor 104, to generate workflow modification 368 utilizing task response processing module 356.

As shown in FIG. 3, workflow modification 368 may be provided as an input to workflow management module 353, and may result in adaptation of workflow 364 based on workflow modification 368. In use cases in which inputs 144/344 omit non-essential responses for generation of annotation 370/470, for example, workflow modification 368 may include a reorganizing of workflow 364 to work around the omitted task or tasks. However, some of tasks 142/342 may be more critical to the generation of annotation 370/470 than others. Failure of inputs 144/344 to include timely responses to critical tasks may result in workflow modification 368 instructing redistribution of those critical tasks to one or more additional annotation contributors in order to ensure generation of annotation 370/470.

It is further noted that, in some implementations, the method outlined by flowchart 250 may include additional actions related to machine learning. For example, subsequent to generation of annotation 370/470 in action 257, model-driven annotation software code 110/310 may receive corrective feedback. In some implementations, for example, a human annotation editor, such as user 124, may review annotation 370/470 and make corrections, e.g., additions, deletions, or modifications, to one or more of annotation entries 472a-472m, function links 476, or role link 474.

The corrective feedback received by model-driven annotation software code 110/310 may be used as training data by model-driven annotation software code 110/310. Moreover, model-driven annotation software code 110/310 may alter its process for determining workflow 364, or even for identifying data model 362, based on that training data. In other words, in some implementations, model-driven annotation software code 110/310 may be configured to learn from the corrective feedback it receives in response to generation of annotation 370/470, in order to improve the quality of annotations generated in the future.

Thus, the present application discloses media content annotation solutions. By providing media content annotation systems and methods designed to determine an annotation workflow based on a data model corresponding to the media content requiring annotation, the present solution can advantageously be adapted to a wide variety of media content types. In addition, by identifying one or more annotation contributors for performing tasks included in the workflow, and distributing the tasks accordingly, the present solution actively manages workflow processing and completion. Moreover, the present solution advantageously ensures that the annotations generated through its use are richly connected by being stored and linked in a non-relational annotation database.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A media content annotation system comprising:
    a computing platform including a hardware processor and a system memory;
    the system memory storing a model-driven annotation software code;
    the hardware processor configured to execute the model-driven annotation software code to:
        receive a video with timecodes for annotation, the video including scenes indexed to timecodes;
        identify a data model corresponding to the video;
        determine a workflow for annotating the video based on the data model, the workflow including multiple tasks;
        identify at least one annotation contributor for performing the tasks including annotating the scenes using a plurality annotation entries comprising a location, a trait, an actor and an action type;
        distribute the tasks to the at least one annotation contributor;
        receive the plurality of annotation entries from the at least one annotation contributor responsive to at least some of the tasks; and
        annotate the scenes in the video based on the received annotation entries indexed to the timecodes.

2. The media content annotation system of claim 1, further comprising a non-relational annotation database stored in the system memory, wherein the hardware processor is further configured to execute the model-driven annotation software code to store the received annotation entries in the non-relational annotation database.

3. The media content annotation system of claim 2, wherein the non-relational database comprises a triplestore.

4. The media content annotation system of claim 1, wherein the data model corresponds to at least one of dramatic and comedic television content.

5. The media content annotation system of claim 1, wherein the data model corresponds to movie content.

6. The media content annotation system of claim 1, wherein the data model corresponds to news content.

7. The media content annotation system of claim 1, wherein the hardware processor is further configured to execute the model-driven annotation software code to adapt the workflow based on the received annotation entries from the at least one annotation contributor.

8. The media content annotation system of claim 1, wherein the at least one annotation contributor comprises at least first and second annotation contributors, the first annotation contributor being a human, and the second annotation contributor being a machine.

9. A method for use by a media content annotation system including a computing platform having a hardware processor and a system memory storing a model-driven annotation software code, the method comprising:
    receiving, using the hardware processor, a video with timecodes for annotation, the video including scenes indexed to timecodes;
    identifying, using the hardware processor, a data model corresponding to the video;
    determining, using the hardware processor, a workflow for annotating the video based on the data model, the workflow including multiple tasks;
    identifying, using the hardware processor, at least one annotation contributor for performing the tasks including annotating the scenes using a plurality annotation entries comprising a location, a trait, an actor and an action type;
    distributing, using the hardware processor, the tasks to the at least one annotation contributor;
    receiving, using the hardware processor, the plurality of annotation entries from the at least one annotation contributor responsive to at least some of the tasks; and
    annotating, using the hardware processor, the scenes in the video based on the received annotation entries indexed to the timecodes.

10. The method of claim 9, wherein the media content annotation system further comprises a non-relational annotation database stored in the system memory, and wherein the method further comprises storing, using the hardware processor, the received annotation entries in the non-relational annotation database.

11. The method of claim 10, wherein the non-relational database comprises a triplestore.

12. The method of claim 9, wherein the data model corresponds to at least one of dramatic and comedic television content.

13. The method of claim 9, wherein the data model corresponds to movie content.

14. The method of claim 9, wherein the data model is corresponds to news content.

15. The method of claim 9, further comprising adapt the workflow, using the hardware processor, based on the received annotation entries from the at least one annotation contributor.

16. The method of claim 9, wherein the at least one annotation contributor comprises at least first and second annotation contributors, the first annotation contributor being a human, and the second annotation contributor being a machine.

* * * * *